Nov. 3, 1936.          F. R. GOEHRING          2,059,991
VALVE
Filed May 14, 1935          2 Sheets-Sheet 1
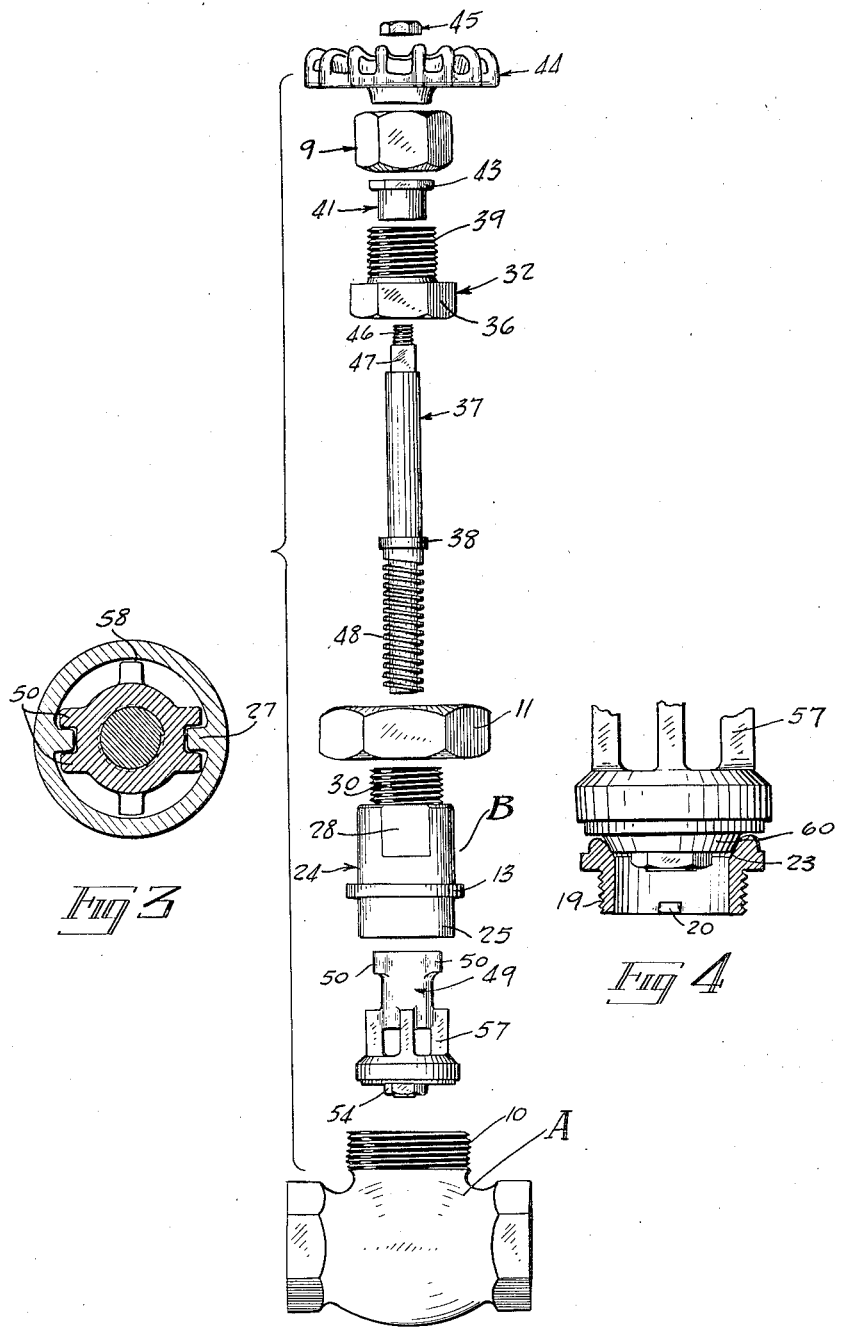

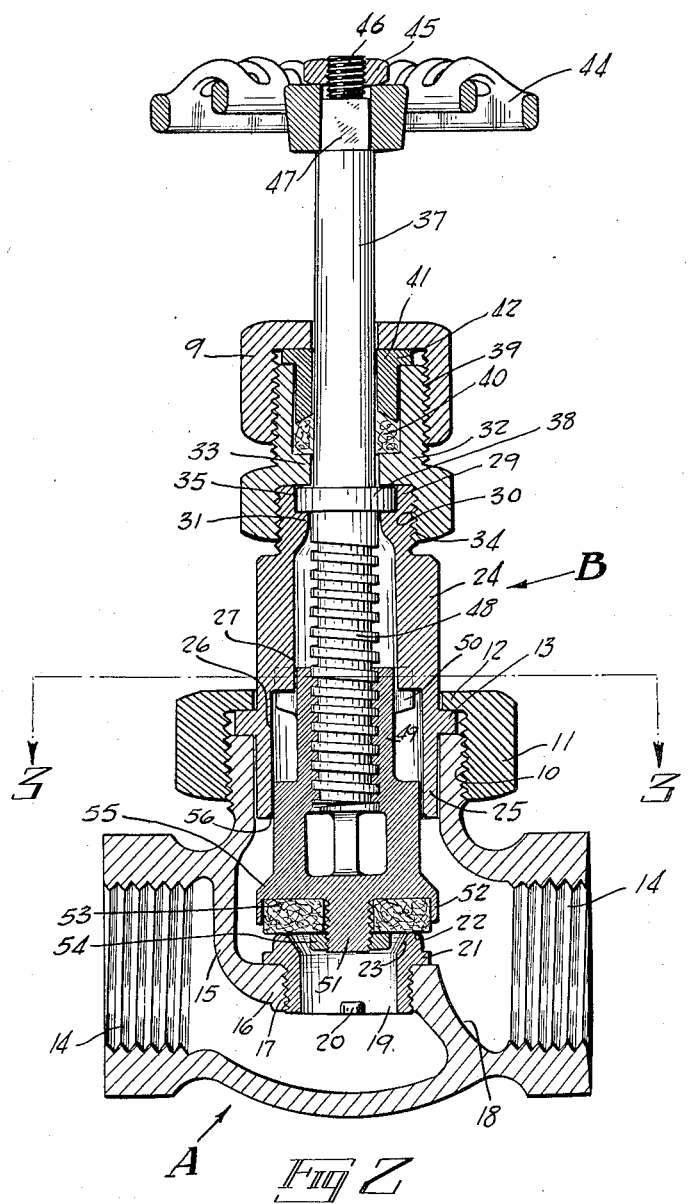

Patented Nov. 3, 1936

2,059,991

UNITED STATES PATENT OFFICE 2,059,991

VALVE

Francis Rudolph Goehring, Philadelphia, Pa., assignor to H. Belfield Company, Philadelphia, Pa., a corporation of Pennsylvania Application May 14, 1935, Serial No. 21,366

1 Claim. (Cl. 251—48)

This invention has to do with the art of valves and is more particularly concerned with that type of valve in which an operating disc and seat are availed of to provide the flow control effects.

Valves of this type, made in accordance with present day practice, have certain characteristic features of construction and operation which are intended to be improved by the present invention. One of these valves ordinarily comprises a valve body having an opening through which a fluid passes and which opening is provided with a seat. A bonnet is associated with the valve body and has a stem mounted therein by a screw thread arrangement. A stuffing box is associated with the body and stem for sealing effects and a disc holder is carried by the stem and is rotatable with respect thereto. A disc carried by the holder is movable into and out of engagement with the seat under the influence of the valve stem which is rotated in the bonnet to provide the necessary longitudinal movement.

A valve of the above noted type, when put in use develops certain undesirable features which are inherent attributes of the conventional construction. Continuous longitudinal movement of the valve stem through the packing in the bonnet causes the building up and congealing on the stem of the fluid materials, the flow of which is controlled by the valve. Such longitudinal movement of the stem with this hardened foreign matter thereon, causes the scoring and cutting of the packing in the stuffing box which necessitates frequent adjustment of the packing gland and at times creates conditions of continuous seepage through grooves which are cut in the packing.

Inasmuch as the disc holder is freely carried by the valve stem, flow of the fluid through the valve body causes rotation of this holder which at times reaches a very high speed. Attendant this rotation are high noise and vibration which are accompanied by a very rapid wear. Very often metallic discs are availed of for use in the disc holder and it is necessary to grind them for proper fitting with the seat. Such grinding operations are only carried out under great difficulty due to the free mounting of the disc holder on the stem. Moreover, considerable annoyance is experienced by those handling these valves when the bonnet is disengaged from the body, in that the disc holders drop off from the stems causing great inconvenience.

Further disadvantages of the known valves of this type are associated with the removable seat rings now in use. These ordinarily provide a flat seat on which foreign matter very easily lodges and remains there to impair the efficiency of the seal afforded by the valve. Whenever a metallic disc of the conical type is to be used, it is necessary to install a seat formed complemental thereto. The usual practice of forming the seats with lugs on their exterior peripheries, makes necessary the use of a special tool to install or remove the seat.

Certain disadvantages are also experienced with the present day stuffing boxes. The valve stems, being threaded therethrough, cause relatively high wear on the packing to the detriment of the joint after continued use. Ordinarily, the glands of these stuffing boxes are provided with round heads which are gripped by a Stillson wrench, or similar tool, to loosen the same when "it freezes" in the stuffing box. This results in the scoring and deformation of the head of the gland with accompanying harmful results.

With the foregoing in view, this invention has in view as an important object the provision of a valve of the seat and disc type in which the valve stem is rotatably mounted in the valve bonnet and held against relative longitudinal movement therein. More particularly, the invention has as an object the provision of a valve of this type in which the disc holder and the valve stem are movable relative to one another.

A further object of the present invention is the provision of a valve in which the disc holder is prevented from rotating with respect to the valve bonnet. In carrying out this thought the disc holder is slidable in the bonnet but rotation in respect thereto is prevented.

Another objective in view is the provision of a valve of the seat and disc type which is characterized by a removable seat ring having a rounded seat. A more detailed feature lies in the provision of a seat ring having a conical seat substantially adjacent the bonnet seat, whereby the seat ring is adapted for use with the flat composition disc or the conical metallic disc.

A further object of the invention is the provision of a removable seat ring of the character described which is provided with lugs projecting inwardly from the inner periphery of the ring.

Another object in view is the provision of a valve body having a web therein formed with an opening, through which fluid flows and which web is "stream lined" to reduce the resistance to flow caused by the web.

A further object of the invention is the provision of a valve bonnet in which the stem is rotatably mounted therein, with a stuffing box which is free from threads. Another feature is the provision of a stuffing box assembly having a gland with a head constituting an abutment and at the same time formed to act as a wrench grip.

Another object of the present invention is the provision of a valve of the seat and disc type which provides a joint between the disc holder and the bonnet when the valve is in its fully opened position. This prevents passage of the fluid through the bonnet to the stuffing box.

In accordance with the above, the present invention comprises a valve made up of a valve body having a web therein formed with an opening through which the fluid flows, this web being "stream lined". The opening is lined with a removable seat ring having a rounded seat which merges with the conical seat. This seat ring is formed with lugs projecting inwardly from the inner periphery thereof. A valve bonnet is affixed to the valve body and has rotatably mounted therein a valve stem which is held against relative longitudinal movement therein by suitable flanged structure. A disc holder is slidably mounted in the bonnet and is in threaded engagement with the stem. The disc holder and bonnet are formed with complemental conical surfaces to provide a seal therebetween upon engagement with each other. A stuffing box arrangement is included in the bonnet and has a packing gland with a head of hexagonal formation which also constitutes an abutment to limit movement of the gland in the stuffing box.

Various other more detailed objects and advantages will in part become apparent and in part be hereinafter described as the description of the invention proceeds. For a full and more complete understanding thereof, reference may be had to the following description and accompanying drawings, wherein:

Figure 1 is a view in side elevation showing the various parts of the valve removed from one another but in their respective positions which they take when assembled.

Figure 2 is a vertical section taken through the valve when assembled,

Figure 3 is a horizontal section taken about on line 3—3 of Figure 2, and

Figure 4 is an enlarged detailed showing, partly in section and partly in elevation, of the disc holder with a metallic conical disc associated therewith.

Throughout the following description, like characters denote corresponding parts.

Referring now to the drawings, the valve body is referred to generally by the reference character A and the bonnet assembly is designated as B. The bonnet B is held assembled on the body A by a connection comprising a threaded neck 10 which is formed on the valve body A and which has threaded thereon a retaining nut 11 having an inwardly projecting flange 12 which clamps a flange 13 formed on the bonnet against the extremity of the threaded neck 10.

Referring now more particularly to Figure 2, the valve body A is shown as having internally threaded connecting parts 14 which are adapted to receive the threaded extremities of conduits in the well-known manner, the valve being intended to control the flow of fluid through said conduits. To this end the valve body is formed with a web 15 which has a horizontally extending portion 16 formed with a threaded opening 17 therein. It is notable that this web 15 is of a stream line design as indicated at 18 to reduce the resistance to the flow of fluid through the valve.

Threadably mounted in the opening 17 is the removable seat ring 19 which, in accordance with the teachings of the present invention, has inwardly projecting lugs 20 on its inner periphery. In the present embodiment these lugs are two in number and diametrically opposite to one another. The seat ring 19 has a flange 21 which engages the horizontal web portion 16 and which flange is formed with a rounded seat as shown at 22. This rounded seat 22 merges into the conical seat 23 which extends to the inner cylindrical surface of the seat ring 19.

Referring now more particularly to the bonnet assembly, a main bonnet member is shown at 24 and when the valve is assembled, this member is clamped to the valve body A by the flange and nut construction 13 and 11 above described. This bonnet member 24 is of cylindrical formation and has a sleeve 25 extending from the flange 13 downwardly into the neck 10. The interior of this bonnet member 24 has an uninterrupted cylindrical surface 26 which extends up to the point where ribs 27 are formed on the inner surface of the bonnet member. These ribs 27 extend longitudinally on the interior of the bonnet and constitute guides for the disc holder as will be later described. Wrench engaging means for holding the bonnet against rotation may take the form of flats 28.

The upper extremity of the bonnet 24 is reduced in diameter to provide the neck 29 which is externally threaded as shown at 30 and which has an inwardly extending flange 31.

A stuffing box 32 having an inwardly extending flange 33 is formed with internal threads 34 that engage the threads 30 with the flange 33 cooperating with the flange 31 of the bonnet to define the groove designated 35. The exterior surface of the stuffing box 32 is of noncircular formation to provide a wrench grip as shown at 36.

A valve stem 37 extends through the stuffing box into the valve bonnet 24, this valve stem 37 being formed with a ring-like flange 38 intermediate its extremities, which flange 38 is received in the groove 35, being held therein by the flange 33 of the stuffing box 32. This valve stem 37 is rotatable in the bonnet assembly but prevented from moving longitudinally therein by the flange construction just described.

A seal for the valve stem 37 takes the form of the stuffing box 32 which has exterior threaded cylindrical portions 39 spaced from the stem 37 to provide spaces for packing, designated 40. This packing is retained in the stuffing box by gland 41 having a head 42 which engages the upper end of the sleeve 37 to limit its movement inwardly with respect thereto. In order to facilitate loosening of the gland 41, the head 42 is deformed to provide a wrench grip as shown at 43. In the illustrated form, the head 43 is shown as being hexagonal. A nut 9 is threaded on the stuffing box 32 and retains the gland 41 in position.

The upper extremity of the valve stem 37 is provided with operating means in the form of a hand grip 44 which is retained on the stem by nut 45 threaded on the valve stem as shown at 46. To provide a driving connection between the hand grip 44 and the stem 37, the latter is squared as shown at 47 and is received in a similarly shaped opening in the grip.

Beginning at a point below the flange 38, the stem 37 is provided with screw threads 48 which are designed to be received in the disc holder now to be described. The latter comprises a cylindrical part 49 of comparatively reduced diameter and this part 49 is formed with two pairs of spaced lugs 50, each pair of which receives therebetween a rib 27 of the bonnet member 24. It is evident that the disc holder 49 may slide in the bonnet member with the ribs 27 cooperating with the lugs 50 to permit such sliding movement and yet preclude any relative rotation between these parts. The disc holder 49 at its other extremity has a threaded stud 51 and spaced therefrom is a cylindrical flange 52. The stud 51 and flange 52 define the groove which receives the disc, which in the illustrated embodiment takes the form of the composition disc shown at 53. This disc is held in position in the holder by nut 54 which is threaded on the stud 51 immediately above the flange 52. The holder 49 is provided with a truncated conically shape surface 55 that cooperates with a complemental conical surface 56 of the bonnet 24 to provide a seal when the two surfaces engage. Guides 57 of rib-like structure connect the lower part of the disc holder with the upper portion thereof and these guides 57 have curved surfaces 58 which are adapted to engage with the inner surface 26 of the bonnet 24 to guide the bonnet during sliding movement.

Figure 4 shows the conical seat 23 of the removable seat ring 19 as it receives a conically shaped metallic disc 60. Such disc may be ground to permit a proper fit with the seat in the well-known manner, relative rotation between the disc holder and the bonnet being prevented by the above described structure.

The operation of the valve hereinbefore described is as follows: A seat ring 19 is threaded home in valve body A. A bonnet assembly including a disc holder with the proper disc (either a flat composition disc or a metallic conical disc) is then assembled with the valve body by screwing up the nut 54. With the valve in a closed position, as shown in Figure 2, the disc 53 engages the rounded seat 22 to provide the sealing effects desired. A good seal is afforded due to the fact that no foreign material may lodge on the rounded surface 22 and also because a line contact is afforded, such line being defined by the tangency between the disc and the rounded surface. If the valve is to be opened, the hand grip 44 is rotated which causes rotation of the valve stem 37 which is held against longitudinal movement in the valve bonnet by the ring 38 and flanges 33 and 31. Rotation of the stem 37, together with the threaded engagement of this stem with the disc holder, causes the latter to be moved up into the bonnet to open the valve. If the valve is to be closed or restricted, rotation of the hand grip 44 in the opposite direction accomplishes this result. It is evident that if the valve is fully opened, the conical surfaces 55 and 56 of the disc holder and bonnet respectively, will engage to provide a seal which prevents any of the fluid passing through the valve and going up to the stuffing box.

The disc holder 56 is held against rotation in the bonnet by the rib and lug arrangement 27 and 50 and wear between these respective parts is therefore substantially eliminated. If the bonnet assembly is removed from the valve body A, the disc holder is maintained a part of the assembly due to the threaded engagement of the stem 37 therewith. If the disc in the disc holder is to be ground, the assembly may be held against rotation by availing of the wrench grips 28 and the grinding readily carried out.

Attention is called to the fact that the retaining nut 11 is so dimensioned with respect to the flange 12 and stuffing box 32 that it will not be disassembled from the bonnet assembly upon removal of the latter from the valve body, this retaining nut being maintained in the space between the flange 13 and stuffing box 32.

Rotation of the seat ring 19 may be effected by inserting any tool, such as a flat bar of iron of proper width, into the ring engaging therein with the lugs 20 which will, with the twisting of the iron, unscrew the seat ring.

While a preferred specific embodiment of the invention is hereinbefore set forth, it is to be understood that I am not to be limited to the exact construction illustrated and described because various modifications of these details may be provided in putting the invention into practice within the purview of the appended claim.

I claim:—

In a valve of the character described, the combination with a valve bonnet, of a disc holder, ribs on the bonnet, lugs on the disc holder engaging the said ribs, and a guide structure formed on said disc holder and engaging the bonnet for guiding relative sliding movement between the said disc holder and the said bonnet, said guide structure consisting of a plurality of ribs, two of which are arranged diametrically oppositely to each other at an angular distance of substantially 90° with respect to the lugs, said guide ribs preventing relative lateral movement between said disc holder and the said bonnet when the valve is installed in a horizontal position.

FRANCIS RUDOLPH GOEHRING.